United States Patent [19]

Hethuin et al.

[11] Patent Number: 4,636,958

[45] Date of Patent: Jan. 13, 1987

[54] ARRANGEMENT FOR RECEIVING TACAN SIGNALS

[75] Inventors: Serge Hethuin, Meudon; Guy F. M. Marin, Boulogne, both of France

[73] Assignee: U.S. Philips Corporation, New York, N.Y.

[21] Appl. No.: 539,583

[22] Filed: Oct. 6, 1983

[30] Foreign Application Priority Data

Oct. 6, 1982 [FR] France ................................ 82 16739

[51] Int. Cl.⁴ ............................................. G06F 15/50
[52] U.S. Cl. ..................................... 364/451; 342/399
[58] Field of Search ....................... 364/443, 449, 451; 343/398, 399; 73/178 R

[56] References Cited

U.S. PATENT DOCUMENTS

| | | | |
|---|---|---|---|
| 3,332,080 | 7/1967 | Verwey | 343/399 |
| 3,821,523 | 6/1974 | Chisholm et al. | 343/399 |
| 3,836,864 | 9/1974 | Jezo | 343/399 |
| 3,940,763 | 2/1976 | Paradise | 343/399 |
| 4,385,300 | 5/1983 | Prill et al. | 364/451 |

OTHER PUBLICATIONS

"A Unified Signal Processor for TACAN Navigation Sets" by Bjerede, Published in Navigation: Journal of the Institute of Navigation, vol. 23, No. 2, 1976, pp. 119-127.

*Primary Examiner*—Gary Chin
*Attorney, Agent, or Firm*—Thomas A. Briody; William J. Streeter; Leroy Eason

[57] ABSTRACT

A receiver for pulse amplitude modulated TACAN signals having 15 Hz and 135 Hz modulating components and which determines the TACAN bearing angle by calculating the phase shift angles $\phi15$ and $\phi135$ of those components of the received signals. The amplitudes of the received pulses and their times of arrival over a given time interval are stored in a memory. From such stored values a microprocessor determines the elements of a column vector Z defined by the pulse amplitudes and arrival times, and the elements of a matrix M defined by the arrival times. A column vector X corresponding to $M^{-1}.Z$ is calculated, the elements of which are trignometric functions of $\phi15$ and $\phi135$, from which those phase shift angles are determined. The TACAN bearing angle is then evaluated from the phase shift angles without requiring circuits to phase lock them with respect to each other.

5 Claims, 20 Drawing Figures

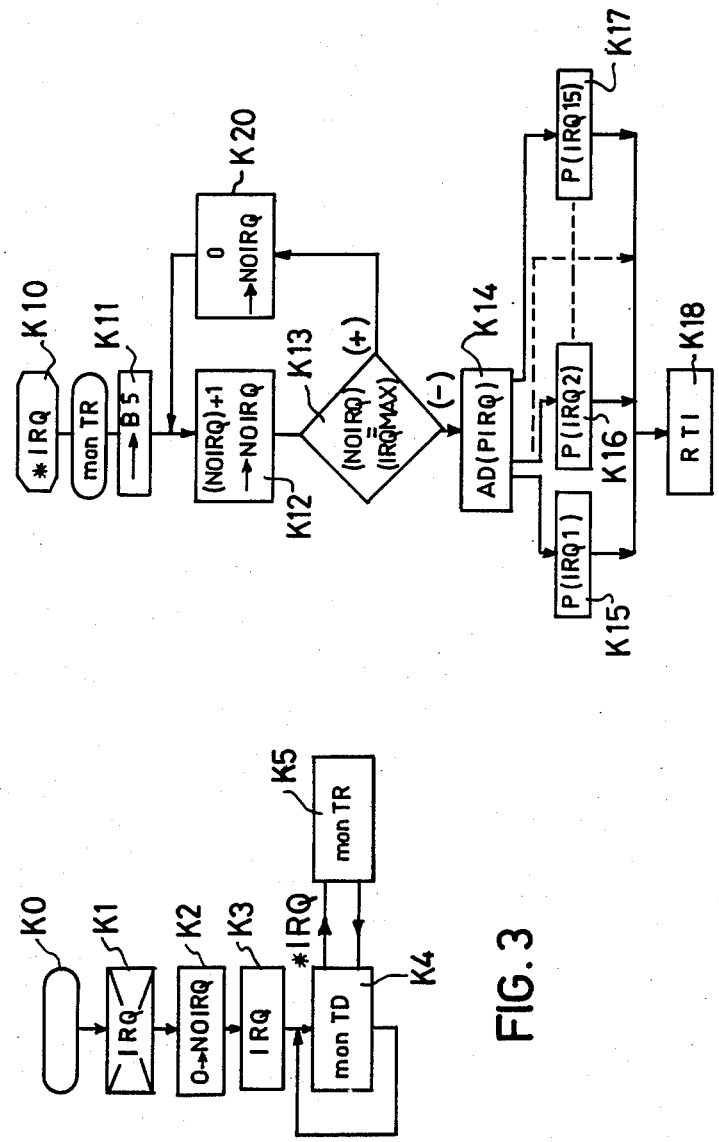

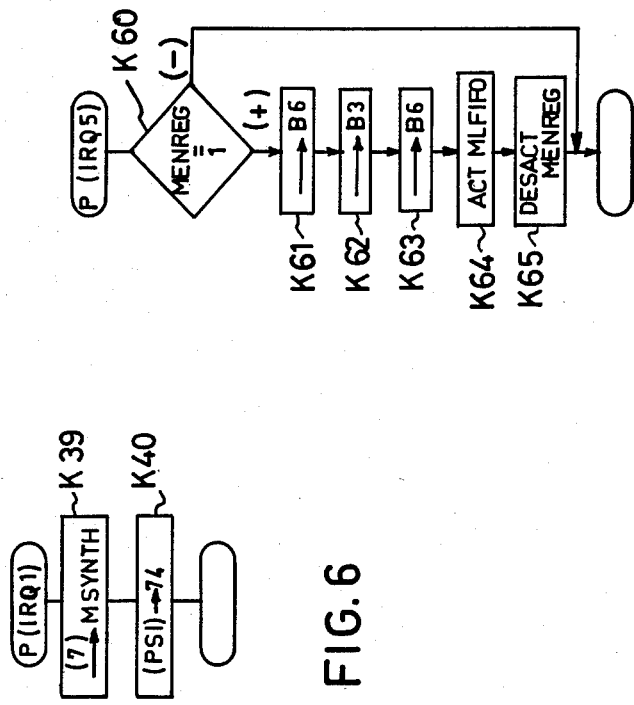
FIG.7
FIG.6
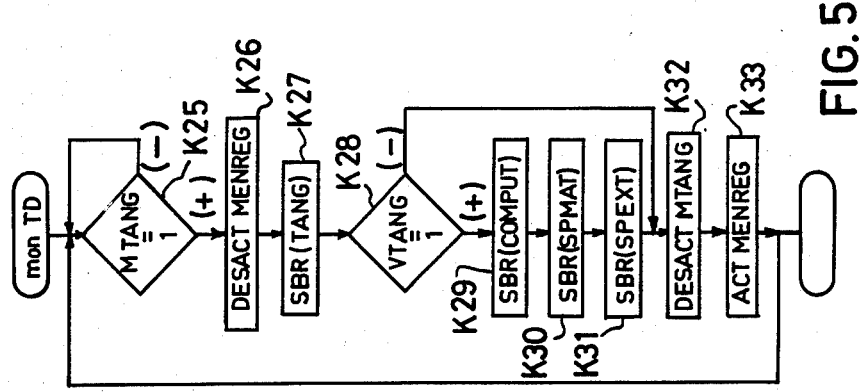
FIG.5

ARRANGEMENT FOR RECEIVING TACAN SIGNALS

BACKGROUND OF THE INVENTION

1. Field of the Invention

The invention relates to an arrangement for receiving TACAN signals, more specifically an arrangement arranged to determine the value of a TACAN bearing angle TAC given by $$TAC = (\phi 135/9) + k \cdot 40°$$

where $k (0 \leq k < 9)$ must be chosen such that:

$$|TAC - \phi 15| \leq 20°$$

The phase shift angles $\phi 15$ and $\phi 135$ of the 15 Hz and 135 Hz beacon pulse modulating signals, respectively, are defined by signals received at the aircraft in the form of pulses whose amplitude y(t) as a function of the time "t" can be written:

$$y(t) = a \sin(\omega t + \phi 15) + b \sin(9\omega t + \phi 135) + c + n(t)$$

where a, b, c, $\omega$ are constants and n(t) is a noise component.

2. Description of the Related Art

Arrangements of this type are used in aerial navigation. They have for their object to determine the position of aircraft in which they are installed. This position is determined with respect to a beacon which transmits locating signals. The known arrangements use phase-locking circuits to determine the values $\phi 135$ and $\phi 15$. These circuits do not have a satisfactory behaviour as regards sudden variations in the input level of the pulses and rapid changes in the position of the aircraft.

SUMMARY OF THE INVENTION

The invention has for its object to provide a receiving arrangement of the type described in the opening paragraph which, by extensively processing the received signals, avoids this poor behaviour of known arrangements to a significant degree. To that end, an arrangement for receiving TACAN signals is characterized in that it comprises accumulator means for accumulating a number N of amplitude modulated pulses y(ti) with correlatively the information $t_i''$ which determines their times of arrival, storing means to store (1) data representing a matrix M defined by $$M = \begin{bmatrix} M_{1,1} & M_{1,2} & M_{1,3} & M_{1,4} & M_{1,5} \\ M_{2,1} & M_{2,2} & M_{2,3} & M_{2,4} & M_{2,5} \\ M_{3,1} & M_{3,2} & M_{3,3} & M_{3,4} & M_{3,5} \\ M_{4,1} & M_{4,2} & M_{4,3} & M_{4,4} & M_{4,5} \\ M_{5,1} & M_{5,2} & M_{5,3} & M_{5,4} & M_{5,5} \end{bmatrix}$$

where:

$$M_{1,1} = N \quad M_{2,2} = \sum_{i=1}^{N} \sin^2 \omega ti \quad M_{3,3} = \sum_{i=1}^{N} \cos^2 \omega ti$$

$$M_{4,4} = \sum_{i=1}^{N} \sin^2 \omega' ti \quad M_{5,5} = \sum_{i=1}^{N} \cos^2 \omega' ti$$

$$M_{1,2} = M_{2,1} = \sum_{i=1}^{N} \sin \omega ti \quad M_{1,3} = M_{3,1} = \sum_{i=1}^{N} \cos \omega ti$$

$$M_{1,4} = M_{4,1} = \sum_{i=1}^{N} \sin \omega' ti \quad M_{1,5} = M_{5,1} = \sum_{i=1}^{N} \cos \omega' ti$$

$$M_{2,3} = M_{3,2} = \sum_{i=1}^{N} \sin \omega ti \cdot \cos \omega ti$$

$$M_{2,4} = M_{4,2} = \sum_{i=1}^{N} \sin \omega ti \cdot \sin \omega' ti$$

$$M_{2,5} = M_{5,2} = \sum_{i=1}^{N} \sin \omega ti \cdot \cos \omega' ti$$

$$M_{3,4} = M_{4,3} = \sum_{i=1}^{N} \cos \omega ti \cdot \sin \omega' ti$$

$$M_{3,5} = M_{5,3} = \sum_{i=1}^{N} \cos \omega ti \cdot \cos \omega' ti$$

$$M_{4,5} = M_{5,4} = \sum_{i=1}^{N} \sin \omega' ti \cdot \cos \omega' ti$$

(2) data representing a column vector Z defined by $$Z = \begin{matrix} \sum_{i=1}^{N} y(ti) \\ \sum_{i=1}^{N} y(ti) \sin \omega ti \\ \sum_{i=1}^{N} y(ti) \cos \omega ti \\ \sum_{i=1}^{N} y(ti) \sin \omega' ti \\ \sum_{i=1}^{N} y(ti) \cos \omega' ti \end{matrix}$$

The arrangement further comprises calculating means for calculating a column vector X from matrix M and column sector Z, given by $$X = \begin{vmatrix} x1 \\ x2 \\ x3 \\ x4 \\ x5 \end{vmatrix} = \begin{vmatrix} c \\ a \cos \phi 15 \\ a \sin \phi 15 \\ b \cos \phi 135 \\ b \sin \phi 135 \end{vmatrix} = M^{-1} \cdot Z$$

and for determining the angles $\phi 15$ and $\phi 135$ by evaluating:

$$\phi 15 = \text{arctg } x3/x2$$

$$\phi 135 = \text{arctg } x5/x4$$

and therefrom the TACAN angle TAC as described in the first paragraph above.

BRIEF DESCRIPTION OF THE DRAWINGS

The following description which is given by way of non-limitative example with reference to the accompanying drawings will make it better understood how the invention can be put into effect.

FIG. 3 shows the general flowchart of the operation of the arrangement shown in FIG. 1.

FIG. 4 shows the flowchart of the "real time" monitor TR shown in the flowchart of FIG. 3.

FIG. 5 shows the flowchart of the "time lag" monitor TD shown in the flow chart of FIG. 3.

FIG. 6 shows the flowchart of the sub-program IRQ1 mentioned in the flowchart of FIG. 4.

FIG. 7 shows the flowchart of the sub-program IRQ5 mentioned in the flowchart of FIG. 4.

DESCRIPTION OF THE PREFERRED EMBODIMENTS

Figure 1:
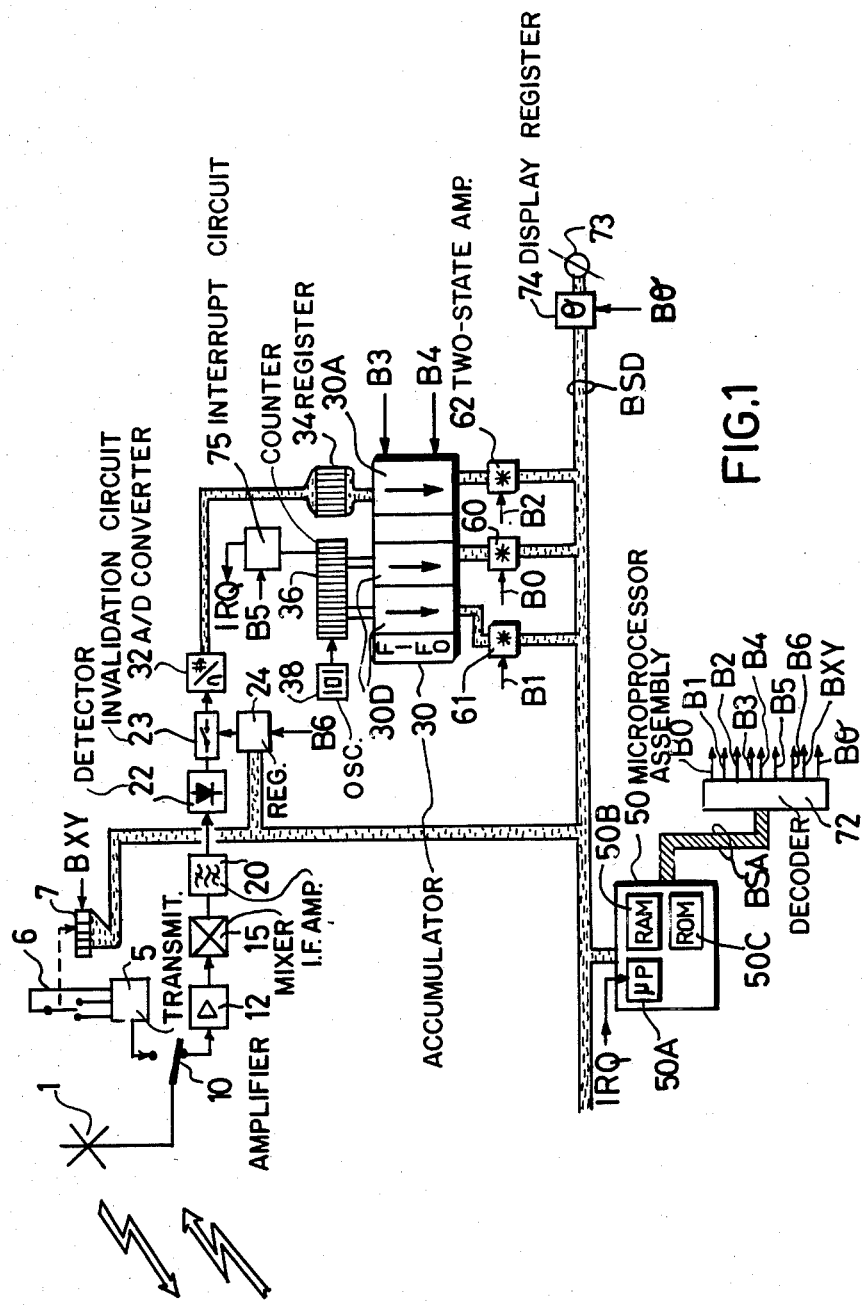
FIG. 1 shows an arrangement for receiving TACAN signals according to the invention.

The arrangement according to the invention which will be described hereinafter is intended to process TACAN signals. A standard STANAG 5034 for TACAN signals, issued by the NATO Military Agency for Standardization (MAS) on July 7, 1972, officially defines these signals.

In accordance with this procedure, an aircraft takes its bearing relative to a radio beacon which transmits, on a carrier of the order of gigahortz the amplitude-modulated pulses. The envelope S(t) of this modulation is written:

$$S(t) = 0,5 + A_{15} \sin 2\pi \cdot 15(t-\theta) + A_{135} \sin 2\pi \cdot 135(t-9\theta)$$

$$A_{15} = A_{135} = 0,105 \pm 0,045$$

$\theta$ is the bearing angle TAC, i.e. the information the arrangement according to the invention must furnish to the user. The origin of the time t=0 is defined by reference trains which are pulse sequences which are regularly distributed in the time. Two reference trains are distinguished: a first train which periodically appears every 1/15 seconds and a second train which periodically appears every 1/135 seconds. As will be described hereinafter, the invention renders it possible to omit the detection of the second reference train without any negative effect on the precision with which the angle $\theta$ is determined. The pulses which do not form part of the reference trains are transmitted at pseudo-random instants. Accordingly it is further assumed in the present specification, that only one pulse of the pair of pulses can be distinguished: these pulses are denoted by y(t) which results in: $y(t)=S(t)$, which expression can be written:

$$y(t) = a \sin (\omega t + \phi 15) + b \sin (9\omega t + \phi 135) + c + n(t) \quad (1)$$

where:
$a = A_{15}$
$b = A_{135}$
$\omega = 2\pi 15$
$\phi_{15} = \theta$
$\phi_{135} = 9\theta$
$C = $ a constant $=$
$n(t)$ is a noise component The arrangement according to the invention comprises first of all an antenna 1 which serves both to transmit the interrogation pulses originating from a transmission section 5 and to receive the response pulses from a TACAN radio beacon, not shown. This section has a control switch 6 to determine the transmission modes X and Y; these modes differ mainly by the time spacing of the pulses. In this respect reference is made to the abovementioned standard STANAG 5034. A register 7 contains information in digital form indicating the position of the control switch 6.

Switching between the interrogation pulses and the response pulses is achieved by means of a transmit-receive switch or duplexer 10. These response pulses, after having passed through the duplexer 10, are amplified by an amplifier 12, and thereafter their carrier is changed by means of a mixer circuit 15. They are then further amplified by an intermediate frequency amplifier 20, and a detector 22 recovers at its output the pulses whose amplitude y(t) is given by the formula (1). An invalidation circuit 23 is connected to this detector 22 and is shown in the form of a switch whose positions, open or closed, are controlled by the content of a register 24. When open, it prevents the output signal of detector 22 from reaching analog-to-digital converter 32.

To derive the bearing angle, the arrangement in FIG. 1 comprises accumulator means 30 for accumulating N pulses in digital form obtained from an analog-to-digital converter 32 connected to the output of the invalidation circuit 23 and cooperating with a storage register 34; accumulator means 30 is basically a memory of the "first-in, first-out" type, commonly known as a FIFO memory. Such means do not only store the pulses, but also data regarding, the time at which they arrive. These arrival data are processed by a time counter 36, which counts the signals from a quartz oscillator 38. Consequently, the accumulator 30 has two portions. A portion 30A for the accumulation of the amplitudes of the sequential pulses encoded with eight binary elements and a portion 30D for the accumulation of the arrival time data encoded with sixteen binary elements of which 15 are significant bits. The arrangement in FIG. 1 further comprises storage means for storing data representing a matrix M given by $$M = \begin{vmatrix} M_{1,1} & M_{1,2} & M_{1,3} & M_{1,4} & M_{1,5} \\ M_{2,1} & M_{2,2} & M_{2,3} & M_{2,4} & M_{2,5} \\ M_{3,1} & M_{3,2} & M_{3,3} & M_{3,4} & M_{3,5} \\ M_{4,1} & M_{4,2} & M_{4,3} & M_{4,4} & M_{4,5} \\ M_{5,1} & M_{5,2} & M_{5,3} & M_{5,4} & M_{5,5} \end{vmatrix}$$

where:

$$M_{1,1} = N \quad M_{2,2} = \sum_{i=1}^{N} \sin^2 \omega ti \quad M_{3,3} = \sum_{i=1}^{N} \cos^2 \omega ti$$

$$M_{4,4} = \sum_{i=1}^{N} \sin^2 \omega' ti \quad M_{5,5} = \sum_{i=1}^{N} \cos^2 \omega' ti$$

$$M_{1,2} = M_{2,1} = \sum_{i=1}^{N} \sin \omega ti \quad M_{1,3} = M_{3,1} = \sum_{i=1}^{N} \cos \omega ti$$

$$M_{1,4} = M_{4,1} = \sum_{i=1}^{N} \sin \omega' ti \quad M_{1,5} = M_{5,1} = \sum_{i=1}^{N} \cos \omega' ti$$

$$M_{2,3} = M_{3,2} = \sum_{i=1}^{N} \sin \omega ti \cdot \cos \omega ti$$

$$M_{2,4} = M_{4,2} = \sum_{i=1}^{N} \sin \omega ti \cdot \sin \omega' ti$$

$$M_{2,5} = M_{5,2} = \sum_{i=1}^{N} \sin \omega ti \cdot \cos \omega' ti$$

$$M_{3,4} = M_{4,3} = \sum_{i=1}^{N} \cos \omega ti \cdot \sin \omega' ti$$

$$M_{3,5} = M_{5,3} = \sum_{i=1}^{N} \cos \omega ti \cdot \cos \omega' ti$$

$$M_{4,5} = M_{5,4} = \sum_{i=1}^{N} \sin \omega' ti \cdot \cos \omega' ti$$

The storage means further stores data representing a column vector Z given by $$Z = \sum_{i=1}^{N} y(ti)$$

$$\sum_{i=1}^{N} y(ti) \sin \omega ti$$

$$\sum_{i=1}^{N} y(ti) \cos \omega ti$$

$$\sum_{i=1}^{N} y(ti) \sin \omega' ti$$

$$\sum_{i=1}^{N} y(ti) \cos \omega' ti$$

The arrangement in FIG. 1 also comprises calculating means for calculating a column vector X from matrix M and column vector Z, given by $$X = \begin{vmatrix} x1 \\ x2 \\ x3 \\ x4 \\ x5 \end{vmatrix} = \begin{vmatrix} c \\ a \cos \phi 15 \\ a \sin \phi 15 \\ b \cos \phi 135 \\ b \sin \phi 135 \end{vmatrix} = M^{-1} \cdot Z$$

The calculating means determines the angles $\phi 15$ and $\phi 135$ by evaluating:

$$\phi 15 = \text{arctg } x3/x2$$

$$\phi 135 = \text{arctg } x5/x4$$

and from them the TACAN angle TAC from the relations $$TAC = (\phi 135/9) + (k \times 40°)$$

$$|TAC - \phi 15| \leq 20°$$

$$0 \leq k < 9$$

The storing means and the calculating means are formed by a microprocessor assembly 50 which particularly comprises a microprocessor 50A, a read/write memory 50B RAM and a read-only memory 50C (ROM) in which the instructions determining the mode of operation of the arrangement are stored.

To evaluate the column vector $\vec{X}$ from M and $\vec{Z}$, it is proposed to start, as will be described in greater detail in the annex, by iterations by means of a recursive expression of the form:

$$X_n = D^{-1}[-(J+H)X_{n-1} + Z]$$

where D, which represents a diagonal matrix, and (J+H) satisfy the expression:

$$M = D - [-(J+H)]$$

A justification of this matrix notation is given in the annex in this specification:

The assembly 50 communicates with the exterior via at least two buses: a sixteen-wire address bus BSA and a eight-wire data bus BSD. The outputs of the FIFO memory 30 are connected to the bus BSD by means of a switching circuit formed by three two-state amplifiers 60, 61, 62 whose conductive or non-conductive states are determined by a signal applied to the wires B0, B1, B2, respectively. These signals originate from a decoder 72 connected to the bus BSA. To cause a signal to appear to one of these wires B0, B1 and B2, it is sufficient to generate the suitable address code on the bus BSA. The bearing information $\theta$ or TAC appears at a terminal 73, which is connected to the output of a display register 74 which is controlled by a signal conveyed by a wire B$\theta$ coming from the decoder 72, the data input of this register 74 being connected to the bus BSD. The registers 7 and 24 described in the foregoing are also connected to the bus BSD; the signals present on the wires BXY and B6 supplied by the decoder 72 enable the exchange of information between the assembly 50 and these respective registers 7 and 24.

The microprocessor used in this example is the microprocessor 6809 manufactured by MOTOROLA. This microprocessor is of a type comprising an interrupt function; to control this function, an interrupt signal must be applied to the input IRQ of the microprocessor 50A. This input is connected to the output of an interrupt circuit 75 coupled to the time counter 36. This circuit 75 is a bistable trigger circuit in which the most significant binary element of the time counter 36 is generated; a reset-to-zero signal conveyed via the wire B5 connected to the output of the decoder 72 resets this bistable trigger circuit to zero.

Figure 2:
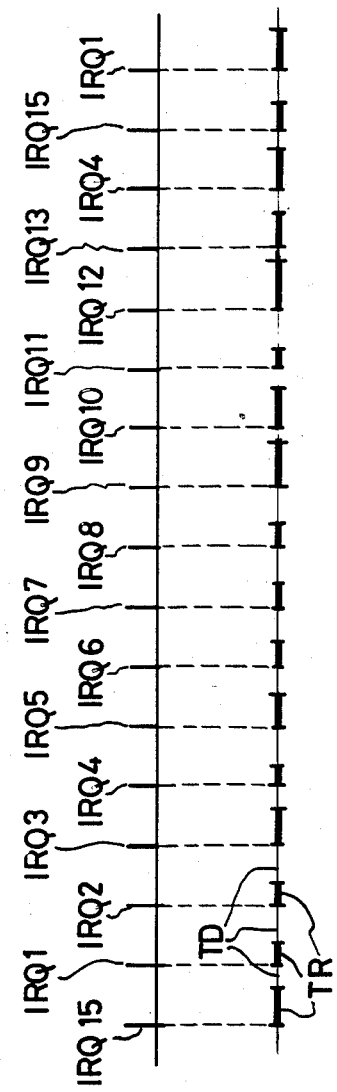
FIG. 2 shows, as a function of the time, the numbering of the various interruptions necessary to explain the function of the arrangement shown in FIG. 1.

The time counter is a counter having sixteen binary elements of which fifteen elements are actually necessary to determine the time of arrival of the pulses. As the frequency of the clock signals 38 is fixed at 4423680 Hz, an interrupt is obtained every 1/135s. In the microprocessor of the assembly 50 these signals trigger different interrupt programs. Each program is determined by an interrupt number; fifteen types of interruptions IRQ1 to IRQ15 (see FIG. 2) are counted; the change in the value of the sixteenth binary element of the time counter 36 indicates a change in the interrupt.

The read-only memory 50C which forms part of the microprocessor assembly 50 contains different program instructions. These different instructions are organized in two monitors: a so-called real-time monitor (mon:TR) and a so-called differential-time monitor (mon:TD). The lower wire in FIG. 2 indicates the time reserved to the operations to be effected by these different monitors. At each appearance of an interrupt, the real-time monitor is called and finishes its jobs well before, in principle, another interrupt appears, so that between the end of the task assigned to an interrupt and the appearance of a new interrupt time is available for the differential-time monitor (mon:TD). To describe in greater detail the operation of the arrangement according to the invention, several possibilities of the microprocessor 6809 used will be mentioned hereinafter. Resort is therefore had particularly to the index registers X and Y, the hardware stack pointer S, all these elements having a capacity of sixteen binary elements, to the accumulators A and B having eight binary elements, but which by concatenation form the sixteen-binary element register D. For further details about this microprocessor reference may be had to the manuals supplied by the manufacturer.

FIG. 3 shows the general flowchart of the arrangement according to the invention. This flowchart and also the subsequent flowcharts are formed by several boxes. In FIG. 3, the box K0 marks the beginning of the program. The first operation which is effected is an interrupt masking operation (box K1), so that these interrupts which are continuously generated by the circuit 75 will not disturb the initiating operations which follow (box K2). In these initiating operations it would only be noted that the content of a memory denoted by NOIRQ is set to "0". Box K3 corresponds to the operation which removes the mask from the interrupts. The subsequent operations are determined by the monitor TD (box K4) when there are no interrupts. In contrast therewith, from the moment an interrupt appears the monitor TR (box K5) arranges the tasks to be effected, when these tasks have ended, one returns to the tasks of the monitor TD which were stopped on the appearance of the interrupt.

Figure 16:
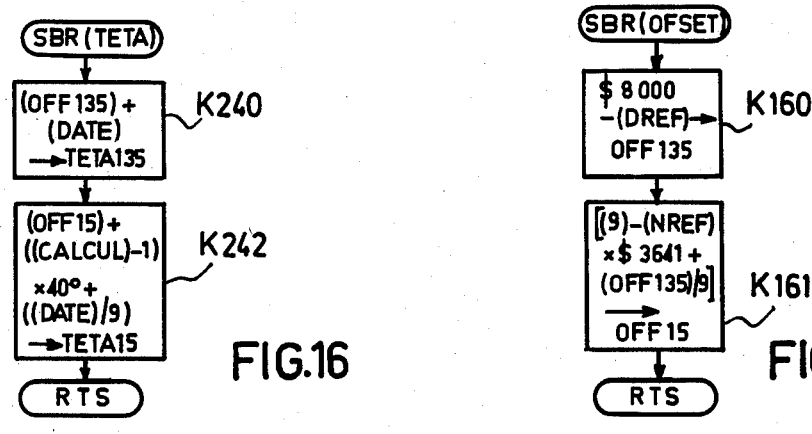
FIG. 16 shows a flowchart of a sub-program TETA mentioned in the flowchart of FIG. 15.

FIG. 4 shows the composition of the monitor TR; this monitor does not come into action, as described already in the foregoing, until the appearance of an interrupt, which is indicated in box K10. The first operation effected by this monitor is to reset the circuit 75 to zero; to that end a signal is caused to appear on the wire B5 (box K11); thereafter the content of the memory NOIRQ (box K12) is incremented by one unit. Thereafter the content of this memory NOIRQ is compared to the content of a memory IRQMAX in which the figure 16 is written (box K13). If there is no equality between the contents of these memories, the content of the memory NOIRQ will determine the address where the interrupt programs can be found (box K14). There are fifteen interrupt programs P(IRQ1), P(IRQ2) . . . P(IRQ15) (boxes K15, K16 , . . . K17, respectively). Within the scope of the invention, there is in practice only interest in the interrupt programs P(IRQ1), P(IRQ5) . . . P(IRQ15), the other programs being assigned to tasks which are not part of the invention. All the interrupt programs end by an instruction of the type RTI (box K18), which indicates that a switch is made to the monitor TD. If the test indicated in box K13 has a positive result, the content of the memory NOIRQ (box K20) is reinitiated.

The tasks to be effected by the monitor TD are shown with the aid of the flowchart of FIG. 5. The first operation effected (box K25) is a test on an indicator MTANG. This indicator, and also other indicators which will be mentioned hereafter, are memories whose content may be equal to either "1" or "0". When the content is "1", the indicator is said to be activate and when the content is "0" to be inactive. If the indicator NTNAG is activated, this indicates that the processing operation to obtain the bearing angle is required. If not, one proceeds to a stand-by phase: a return is made to this test. This indicator MTANG is activated in an interrupt program, not further described from the moment a certain quality of the received signals is obtained. To undertake this processing operation, the indicator MENREG (box K26) is first rendered inactive, which will have for its effect, as will become evident hereinafter, that the memory 30 is blocked for any new recording. Thereafter one proceeds (box K27) to a sub-program TANG which has for its object to search for the reference trains and to date them. It may happen that this search is unsuccessful, in that case a "0" is entered in a memory VTANG and if this search is successful, an "1" is then entered into memory VTANG. The content of this memory VTANG is tested in box K28. If the content is equal to "1" one proceeds to a series of operations defined by the sub-programs COMPUT (box K29), SPMAT (box K30), SPEXT (box K31). All these sub-programs will be described in detail in the further description of this memory. At the end of these operations, the angle TAC will be calculated and will be ready for display, which will be effected during the interrupt program P (IRQ1). Thereafter, in box K32, the indicator MTANG is rendered inactive and, box K33, the indicator MENREG is activated. If the test indicated in box K28, on the content of the memory VTANG differs from "1", one proceeds immediately to box K32.

The interrupt program P (IRO1) whose flowchart is shown in FIG. 6 consists on the one hand of reading the input data (particularly the content of the register 7 which indicates the present TACAN mode will be transferred to a memory designated MSYNTH) and, on the other hand of supplying output data (particularly, the content of a memory PSI in which the angle TACAN is contained will be transferred to the display register 74).

The flowchart shown in FIG. 7 relates to the interrupt program P (IRQ5). The first job (box K60) is testing of the the value of the indicator MENREQ; if this value is not equal to "1", one immediately proceeds to the end of the interrupt program; if the value is equal to "1" the reception is blocked (block K61). To that end a blocking word transmitted via the BUSD is stored in the register 24 from where an active signal appears on the wire B6. The interrupt circuit 23 or invalidation circuit, is adjusted to the open position. Thereafter the total content of the memory 30 is set to zero (box K62). For that purpose a signal is caused to appear on the wire B3 which is connected to the reset-to-zero control of the memory 30. Thereafter, the reception signals is enabled by recording a new word in the register 24 (box K63) by causing a signal to appear again on the wire B6. At that moment the memory FIFO is ready to receive the TACAN pulses whose amplitude is digitally encoded and their "date" of arrival is supplied in the digital form by the counter 36. The box K64 following after these last-mentioned operations represents the job of activating the indicator MLFIFO and the box K65 subsequent thereto represents the job of rendering the indicator MENREG inactive.

Figure 9:
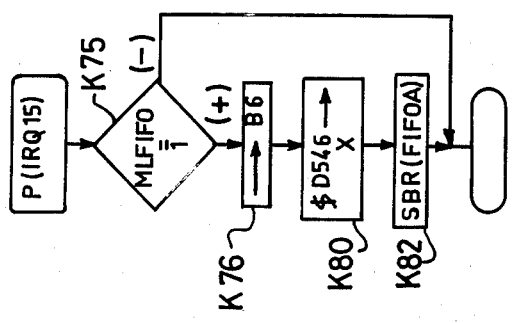
FIG. 9 shows the flowchart of the sub-program IRQ15 mentioned in the flowchart of FIG. 4.
Figure 8:
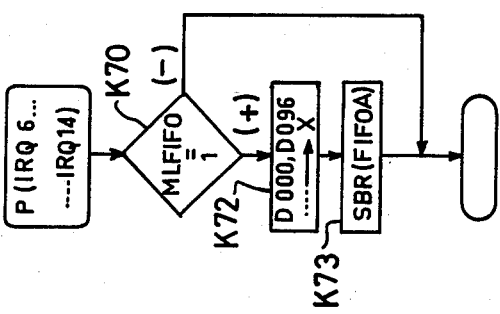
FIG. 8 shows the flowchart of the sub-programs IRQ6 to 14 mentioned in the flowchart of FIG. 4.

The programs to be effected for the interrupts IRQ6 to IRQ14 (FIG. 8) are the same. The first job (box K70) which is effected is testing of the indicator MLFIFO. If this value is equal to zero, one immediately proceeds to the end of the interrupt program; if its value is "1" the value $ D000 (in hexadecimal notation) for the interrupt IRQ6, DO96 for IRQ7 and so on to, finally, D4BO for IRQ14 are stored in the register X; the register X contains the addresses for storing the data contained in the memory 30. These addresses are necessary for the subsequent procedure which is indicated in box K73. This procedure consists of reading the content of the memory FIFO; the data read are stored as a function of the content of the register X. One hundred and fifty eight-bit bytes are provided for this reading operation; that is to say that fifty TACAN pulses with their dates (two eight-bit) bytes for the date and one eight-bit byte for the amplitude of the pulse) can be read. The interrupt program P (IRQ15) whose flowchart is shown in FIG. 9 is substantially identical to that of FIG. 8 with the exception that after the indicator test MLFIFO (box K75) signal reception is blocked (box K76); the value $ D546 is stored in the register X (box K80) and one proceeds to reading the memory 30 (box K82).

Figure 10:
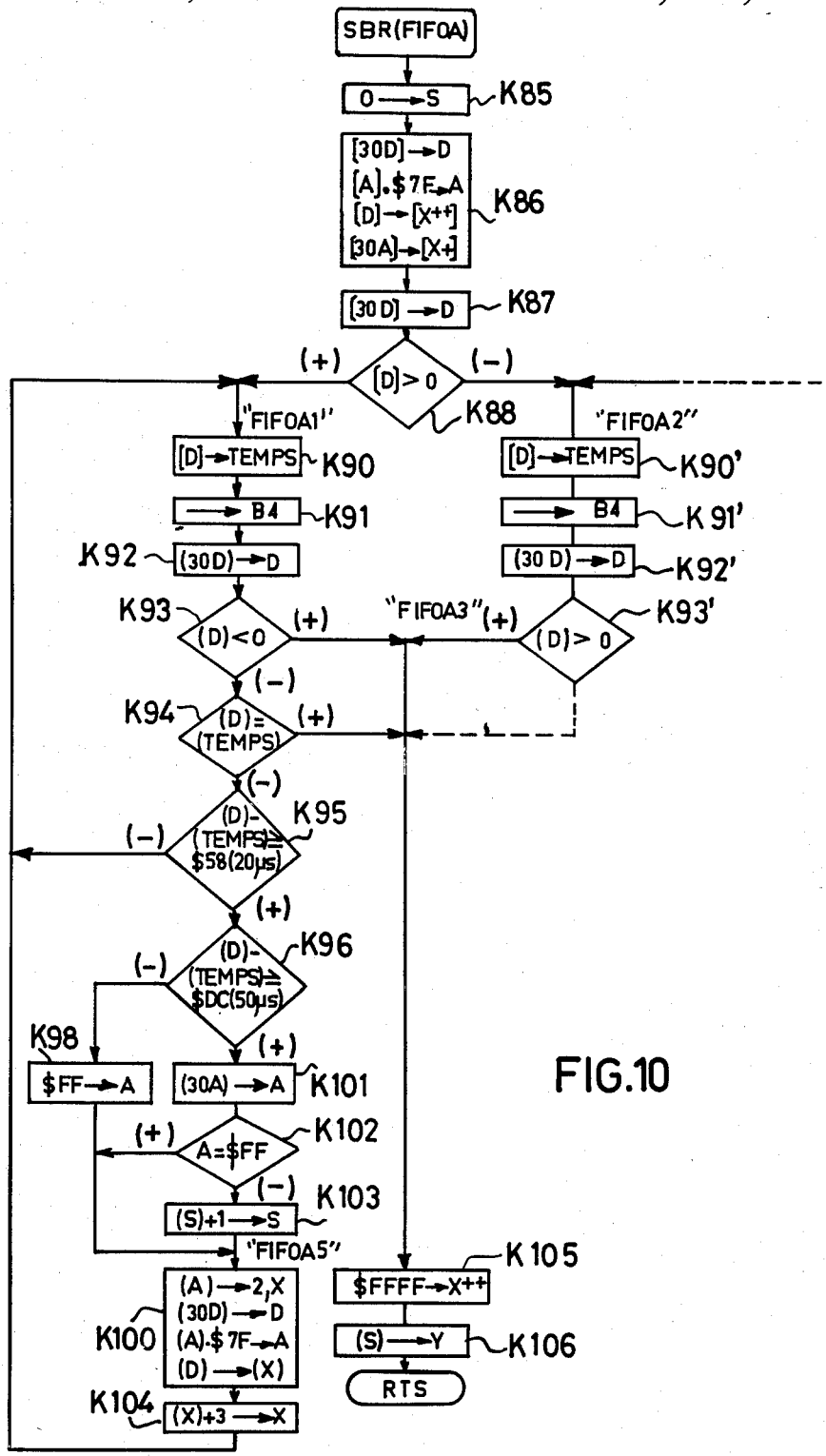
FIG. 10 shows the flowchart of the sub-program F1FOA mentioned in the flowchart of FIGS. 8 and 9.

FIG. 10 shows the flowchart of the procedure SBR (FIFOA) which governs reading of the memory 30. The box K85 indicates the first job to be effected, the value "0" is stored in the register S which has for its tast in this sub-program to contain the number of pulses. In the subsequent box K86 several jobs are indicated. The date which is encoded with sixteen binary elements stored in the portion 30D of the memory FIFO is transferred to the register D by adequately activating the wires B0, B1, B2. Thereafter, the most significant binary element contained in the register A, so that of the date, is rendered equal to "0" by effecting the logic operation AND between each binary element of the content of the register A and of the binary number 01111111 or, in hexadecimal, $ 7F. The data thus processed is stored in the address whose location is defined by the code contained in the register X; after storing, the code contained in this register X is incremented by two units, which is indicated by X++. Thereafter, the amplitude of the pulse available at the output of the memory FIFO is stored in its portion 30A. This content is stored at the location defined by the content of the register X, thereafter this content is incremented by one unit, which is indicated by X+. In box K87, the same datum originating from the portion 30D is stored in the register D. In box K88 the value of the most significant binary element is considered, which may be considered as being a binary element indicating the sign (+) or (−). If the content of D is assumed to be positive, one proceeds to the label "FIFOA1", which is the beginning of a program branch, if it is negative one proceeds to the label "FIFOA2" which is the beginning of another program branch. At the label "FIFOA1" the content of the register D is transferred to a memory TEMPS (box K90). Thereafter (box K91) a signal is caused to appear on the wire B4 by generating an address code suitable for the bus BUSA; this signal has for its effect to shift the content of the memory 30 to the output, both at its portion 30A and at its portion 30D. The content available at the output of the portion 30D is transferred to the register D (box K92), thereafter the sign is checked (box K93). The program branch beginning at the label "FIFOA1" only relates to positive values; if this value checked in box K93 is negative, this means that the following datum does not form part of the same interrupt IRQ as the preceding datum; then one proceeds to the label "FIFOA3". The program branch beginning at the label "FIFOA2" comprises operations indicated in the boxes K90', K91', and K92' which are identical to the operations K90, K91 and K92. To remain in this program branch beginning at "FIFOA2", the value taken from the outputs of the section 30D must always be negative; if they become positive, which is checked in box K92', one proceeds to the label "FIFOA3". The operations which are thereafter effected in this program branch beginning at the label "FIFOA2 are identical to the operations effected in the program branch beginning at the label "FIFOA1". Hereinafter, this program branch "FIFOA2" will not be mentioned anymore.

After the check indicated in the box K93 it is checked (box K94) whether two consecutive values of the date, one contained in the register (D) and the other in the memory TEMPS, are equal. If they are equal, this indicates that the memory FIFO30 does not contain any further dates. To justify this statement, reference is made to the manual of the manufacturer of the memory FIFO used here: namely, the memory Am3341 from "Advanced Micro Device". The positive result of this check again leads to the label "FIFOA3". If the result is negative this leads to a further check (box K95). It is here checked whether the difference between two consecutive dates is more than 20 µs, which taking the value 4423680 Hz of the frequency of the oscillator 38 into account, is written in hexadecimal a $ 58. If the difference is less than 20 µs, the last date is not taken into consideration and one proceeds to the subsequent date, a return is made to the label "FIFOA1". If the difference is more than 20 µs a further test (box K96) is carried out; it is checked whether the difference between two dates is more than 50 µs ($DC), which is normal for impulses responses in accordance with the above-mentioned standard STANAG. If this difference is less than 50 µs and also more than 20 µs, it is assumed that these pulses form part of the main reference train. These pulses are necessary for the proper functioning of the arrangement, but are not directly used for the calculation of the bearing angle; in box K98 the left $FF is assigned to these pulses; one proceeds via register A the content of which is transferred to the memory addressed defined by the content of the register X incremented by two units, which is described in box K100 by the notation (A)→2, X. If the said difference is more than 50 µs, the amplitude code of the pulse available at the output of the portion 30A is stored in the register A (box K101). It is checked whether this content is equal to the value $FF (box K102). If so, one proceeds to the label "FIFO5" preceding box K100. The fact that the amplitude has a value equal to $FF is an indication that the converter 32 has effected a poor conversion. One proceeds directly to the label "FIFOA5" without incrementing the register S which is intended to the contain the number of valid pulses, which is done in box K103 for a negative check indicated in box K102. In addition to the storing operation in register A indicated in box K100, the dates are stored, after the most significant binary element has been eliminated, in the positions indicated by the content of the register X. In box K104 the content of the three units of this register X are incremented, which will result in the addresses for the subsequent data. A return is then made to the label "FIFOA1". At label "FIFOA3", the first action is to place the value $FFFF in the position indicated by the register X (box K105) and the content of this register is incremented by two units; the content of the register S is transferred (K106) to the register Y.

Before continuing the detailed description of how the arrangement functions according to the invention, it is convenient here to give a summary of what has been described in the foregoing;

(1°) The memory FIFO 30 starts storing the pulses at the interrupt IRQ5 (box K63—FIG. 7) and stops storing at the beginning of the interrupt IRQ15 (box K76—FIG. 9).

(2°) The memory FIFO 30 is read during the IRQ6 to 15; during IRQ6, the data read having been stored during IRQ5 etc. and during IRQ15, the data read having been stored during IRQ14. Let it be assumed that not any data have been stored during IRQ15.

(3°) The data read are stored in sets of three eight-bit bytes and $ 96 (150) eight-bit bytes are reserved to each IRQ. The first eight-bit byte is reserved to the most significant elements of the date, the second one to the least significant elements, the third eight-bit byte relates to the amplitude of the pulse TACAN.

(4°) The data stored during IRQ5 are stored from the memory address $ D 000, IRQ6 in $ D096 etc. To mark the end of an IRQ, the code $FFFF (box K105—FIG. 10) is placed, after the last valid datum.

(5°) The end of an IRQ is detected by the change in value of the most significant binary element (box K93—FIG. 10) or by two values of consecutive equal dates (box K94—FIG. 10).

Figure 11:
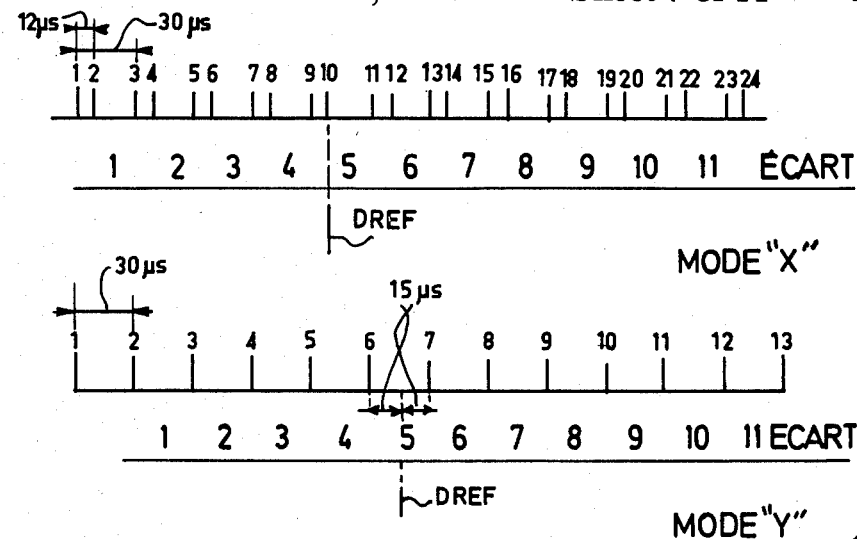
FIG. 11 shows, as a function of the time, the reference pulses of the TACAN signals in the "X" mode and in the "Y" mode.

Before a detailed description of the sub-program SBR (TANG) which is necessary for processing the value of the "date" of the reference trains and, hence the value "t" in the formula (1) at page 5, it is sufficient to bring the structure of these reference trains to mind. This is shown in FIG. 11. The composition of these trains is different depending on whether the "X" mode or the "Y" mode is involved.

According to the "X"-mode, the reference train is formed by 24 pulses numbered 1 to 24 in the FIG. 11; these pulses are transmitted pair-wise, the pulses of one pair are spaced apart by 12 μs and the pairs are spaced by 30 μs. The reference instant DREF is fixed at the pulse having number 10.

In accordance with the "Y" mode, the reference train is formed from 13 pulses numbered 1 to 13, which are interspaced by 30 μs; the reference time DREF is taken between the pulse having number 6 and the pulse having number 7.

In the sub-program SBR (TANG), to detect a reference train, a check is made whether six consecutive time gaps are spaced by 30 μs. These time gaps are shown in FIG. 11 on the lines ECART for the "X" and "Y" modes. The time gaps between the pairs of the "X" mode are numbered 1 to 11. As regards the "Y" mode, it is assumed that the pulses 1 and 2 form a first pair, the pulses 2 and 3 are a second pair and the pulses 3 and 4 a third pair, etc . . . so that, since the detector 22 produces one single pulse from one pair, there are also eleven time gaps. Taking the above description into account and the pulse date which forms a limit on the sixth 30 μs time gap is designated DN, it is possible to write for the "X" mode that:

$$DREF = DN - [18 + (6 \times 30)] + [(11-6) \times 30] \mu s$$

and for the "Y" mode that:

$$DREF = DN[15 + (6 \times 30)] + [(11-6) \times 30] \mu s$$

Figure 12:
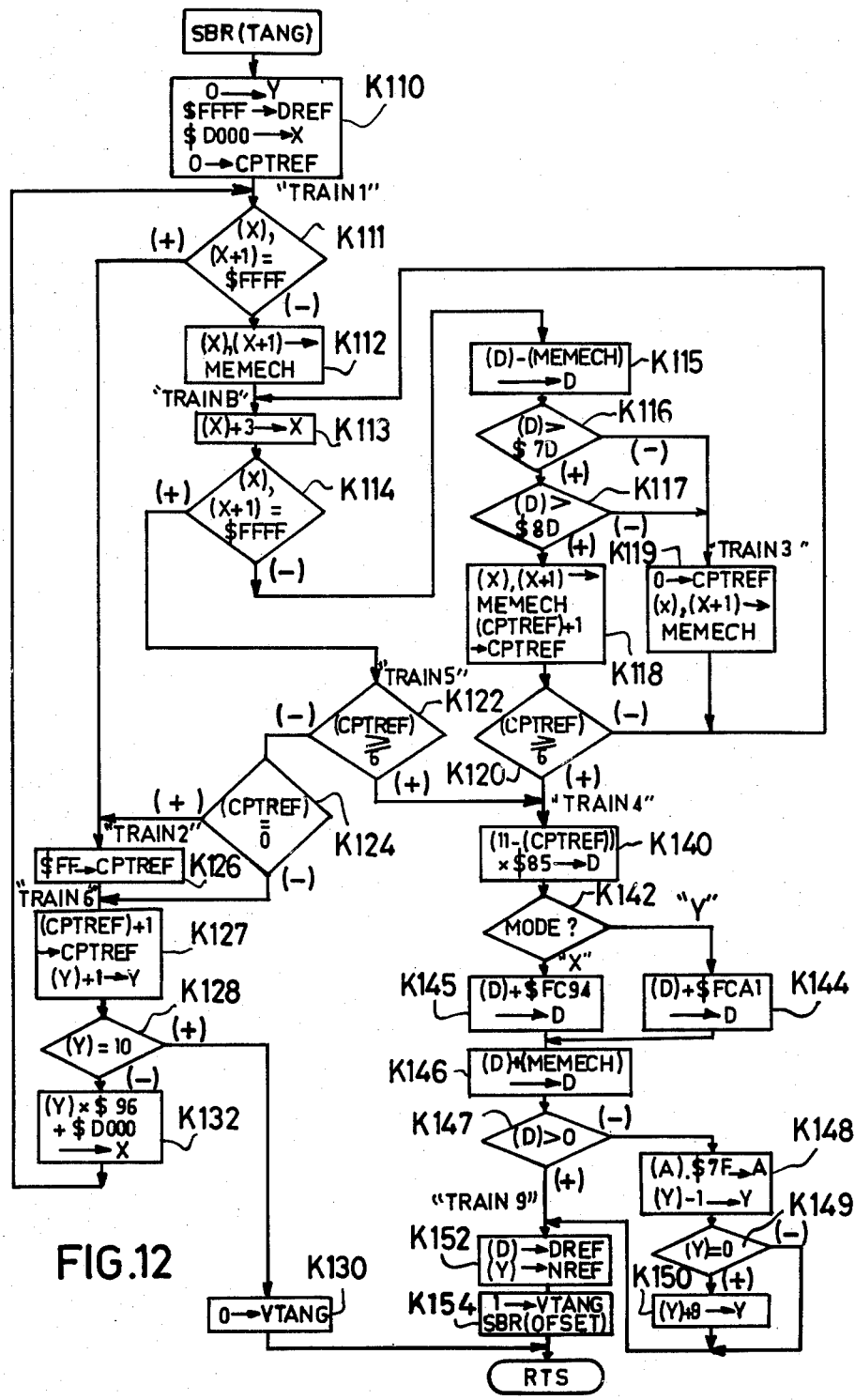
FIG. 12 shows the flowchart of a sub-program TANG mentioned in the flowchart of FIG. 5.

It is now possible to explain the sub-program SBR (TANG) whose flowchart is shown in FIG. 12.

In box K110 the initiating action is represented; the register Y which is intended to contain a figure defining the number of IRQ in which DREF must be considered is adjusted to 0; IRQ5 corresponds to "0", IRQ6 corresponds to "1" . . . , IRQ corresponds to "9". $FFFF is placed in a memory intended to contain DREF, so that if it is not present in this memory location this will be indicated by $FFFF. The value $D000 is put in the register X; this value corresponds to the address in which the first date taken from IRQ5 is stored. Finally the content of a memory CPTREF is initiated the content of which indicates the number of time gaps equal to 30 μs. After this initiating phase, one proceeds to the label "TRAIN1"; at this label a check is made on the date (two eight-bit bytes) indicated by the counter of the register X and by its content incremented by one unit; (box K111) is checked when the date has the value $FFFF which is an indication, as will be remembered of the end of storing data in the memory 30 relative to an IRQ. If the date is equal to $FFFF, one proceeds to the label "TRAIN2", if not this date is stored in a memory MEMECH (box K112); thereafter one proceeds to the label "TRAINB". There the register X (box K113) is incremented by three units, which gives the address of the subsequent date; then it is again checked (box K114) if it is equal to $FFFF; if so, one proceeds to the label "TRAIN5", if not, the difference between this last-mentioned date and the date contained in the memory MEMECH (box K115) is taken; this difference gives the time gap and in the boxes K116 and K117 one checks whether this time gap is equal to 30 μs. Actually, a certain tolerance is allowed; to proceed to box K118, the time gaps are taken which are comprised between 28 μs, or $7D (the value determined by the frequency of the oscillator 38) and 32 μs ($8D). If this time gap is not comprised in this program branch, one proceeds to the label "TRAIN3" where "0" is placed in the memory CPTREF and there the date is placed in the memory MEMECH (box K119) and one returns to the label TRAINB". At box K118, also the last date is placed in the memory MEMECH and the content of this memory is checked, if it is equal to six this means that the reference train has been found, then one proceeds to the label "TRAIN4", if the reference train has not been found, one passes to the label TRAINB" for a new date.

At the label "TRAIN5" a check is also made whether the content of the memory CPTREF is equal to six (box K122); if so, it is assumed that the reference train has been found and one thus proceeds to the label "TRAIN4". If not, it is checked whether the content of the memory CPTREF is equal to "0" (box K124); if it is equal to "0" one proceeds to the label "TRAIN2", if not one proceeds to the label "TRAIN6". The operation indicated in box K126 under the label "TRAIN2" consists in placing $FF in the memory CPTREF, so that at the next incrementation by one unit the content of this memory will become "0". Thereafter, one proceeds to box K127 under the label "TRAIN6". At that box the content of the memory CPTREF and also the register Y are incremented by one unit; at box K128 it is checked whether the content of the register is equal to 10; if so, it means that all the dates of 10 IRQ have been analyzed and that the reference train has not been found, the sub-program then ends by setting the memory VTANG to zero (box K130). If the content of Y is not equal to 10, the new address of the date situated in the following IRQ is calculated (box K132). This address is placed in the register X and a return is then made to the label "TRAIN1".

When one is at the label "TRAIN4", which means that the reference train has been found, then the date to be assigned to DREF must be determined. As a start, at box K140, the quantity:

$(11-6) \times \$85$ is calculated where $85 corresponds to 30 µs, thereafter it is checked at box K142 whether the program is in the "X" mode or in the "Y" mode; to that end, the content of the memory MSYNTH which is a copy of the register 7 is checked. When the program is in the "Y" mode, the value $FCA1 which is the two's complement if the hexadecimal value corresponding to the value 195 µs is added to the content of the register (box K144). If the program is in the "X" mode, the value $FC94 which corresponds to the value $-198$ µs is added (box K145). Thereafter, (box K146), the content of the memory MEMECH is added to one of the values found by the operations indicated in the boxes K144 and K145. Thereafter, it is checked (box K147) whether the value found is not too great, that is to say whether the most significant binary element is equal to "1" (which may be considered as being the binary sign element); if the value found is not too great, one proceeds to the label "TRAIN9"; if it is too great (box K148) it is erased and it is assumed that the reference date must be considered as being contained in the preceding IRQ. "1" is taken from the register Y and when the content of this register becomes negative, 9 is added (box K150) to return to IRQ14.

At the label "TRAIN9" the content of the register D is stored in the memory DREF and the content of Y in NREF (box K152); thereafter, (box K154), "1" is placed in the memory VTANG to indicate that the reference train has been found and one proceeds to the sub-program OFSET.

Figure 13:
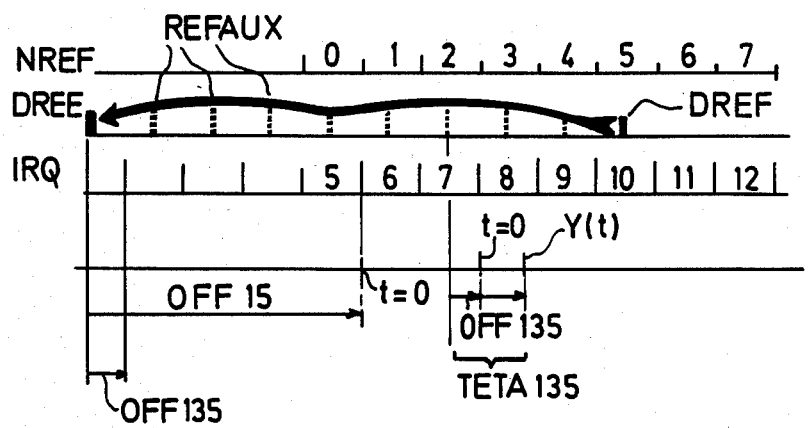
FIG. 13 shows a circuit diagram intended to show, as a function of the time, different quantities OFF 15 and OFF 135 occurring thereafter.

In this sub-program it is purposed to calculate the quantities OFF 135 and OFF15; these quantities are defined in the following way: reference is made to FIG. 13. First of all, the time base t=0 is fixed at the begining of IRQ6. The date DREF of the reference train is determined with respect to the beginning of IRQ in which it is contained and, by the rank of the IRQ considered relative to this reference, this rank is given by NREF. For the modulation at 15 Hz of the TACAN signal nothing is changed if DREF is shifted forward by the quantity equal to the duration of 9IRQ; the date DREE is then obtained, which is the estimated date DREF; between DREE and DREF there are eight auxiliary reference trains REFAUX which are regularly distributed in the time; the quantity OFF15 is the distance separating DREE from the time t=0. The quantities OFF135 is the same quantity but measured "modulo of the duration of an IRQ (modulo $8000)", so that it is immediately written that:

$$OFF135 = \$8000 - DREF$$

These quantities are considered to be angular values, expressed in degrees, where $8000 corresponds to 360°.

For OFF15:

$$OFF15 = (9 = NREF) \times 40° + (OFF135)/9$$

where the value $0E39 is assigned to 40°.

Figure 14:
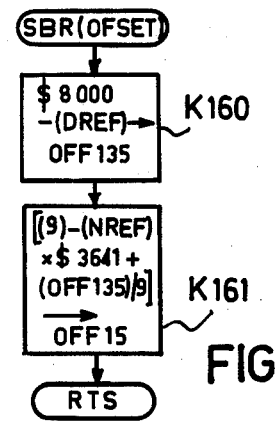
FIG. 14 shows a flowchart of a program OFSET mentioned in the flowchart of FIG. 12.

The flowchart shown in FIG. 14 is derived as described herebelow; at box K160 OFF135 is calculated and at box K161 OFF15 is calculated. The relevant memories have been given the name of these values as their identification.

Figure 15:
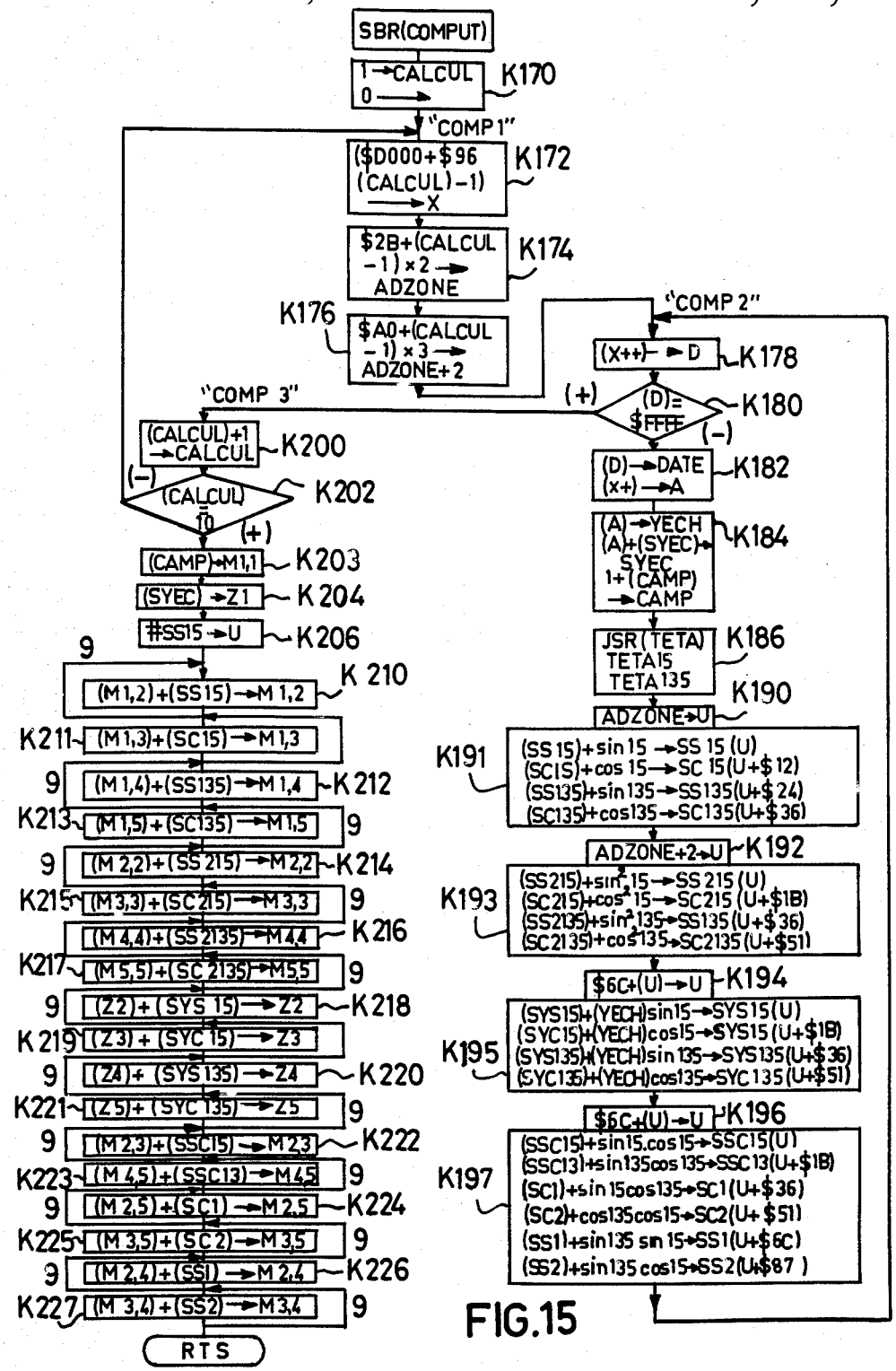
FIG. 15 shows a flowchart of a sub-program COMPUT mentioned in the flowchart of FIG. 5.

In the sub-program COMPUT whose flowchart is shown in FIG. 15 the different quantities Mij of the matrix M and of the column vector Z are evaluated.

At box K170 the different memories are initiated. "1" is placed in a memory designated CALCUL and "0" is placed in different, further memories utilized in this sub-program. One then arrives at the label "COMP1" preceding box K172 where the address of the first eight-bit byte recorded by the sub-program FIFOA during the interrupts IRQ6 to 14 are placed in the register X. At box 174 the address of the data to be accumulated zone by zone (each zone corresponding to a complete storage operation in the memory 30 during an interrupt) is calculated at box K174. These data were accumulated in two eight-bit bytes. The first address is contained in a memory ADZONE. Thereafter, at box K176, the first address ADZONE+2 of the data which were accumulated in the three eight-bit bytes are calculated. Subsequently, one arrives at the label "COMP2". There, at box K178, the date whose location is determined by the register X is placed in the register D. After this date has been stored, the content of the register X is incremented by two units indicated by ++. This date is checked (box K180) to see whether it is equal to $FFFF, if yes, this means that a zone has been investigated and one proceeds to the label COMP3. If no, one proceeds to the box K182 where the content of the register D is placed in a memory DATE which will be utilized in a sub-program TETA; the amplitude of the pulse associated with this date is placed in the register A and the register X is incremented by one unit. At box K184, the content of the register A is transferred to a memory YECH and, with a view to an accumulation, the content of this register A is added to the content of a memory SYEC, and the sum obtained is placed in this same memory SYEC. The content of a memory CAMP is incremented by one unit. At box K186 which follows a sub-program TETA, which has already been mentioned, is used which at the value contained in the memory DATE supplies in two memories TETA15 and TETA135 value corresponding to ωt and 9 ωt. For the sake of simplicity the contents of these memories will be denoted hereinafter by 15 and 135 respectively, when it is preceded by a trigonometrical function. At box K190, the content of the memory ADZONE is placed in the register U. Thereafter, at box K191, the quantity sin (TETA15), designated SIN15 is added to the content of a memory SS15 whose address is given by the register U. This same operation is effected by the memories SC15, SS135 and SC135, whose addresses are furnished by the content of the register U increased by the values $12, $24 and $36, respectively and whose contents are increased by cos 15, sin 135 and cos 135.

At box K192 the content of the memory AD-ZONE+2 is placed in the register U. At box K193, the content of the memories SS215, SC215, SS2135 and SC2135 whose addresses are marked by the content of U, by this content increased by $1B, by $36 and by $51, respectively is increased by the value $\sin^2 15$, $\cos^2 15$, $\sin^2 135$ and $\cos^2 135$. Thereaafter the content of U is increased by $6C (box K194), so that the contents of the memories SYS15, SYC15, SYS135 and SYC135 whose respective addresses are (U), (U)+$1B, (U)+$36 and (U)+$51 is increased by the quantities (YECH)·sin 15, (YECH)·cos 15, (YECH)·sin 135 and (YECH)·cos 135 (box K195).

The content of the register U is incremented by a new quantity $6C (box K196). It is then possible (box K197) to add to the contents of the memories SSC15, SSC13, SC1, SC2, SS1 and SS2 marked by U, U+$1B, U+$36, U+$51, U+$6C and U+$87, the quantities sin 15·cos 15, sin 135·cos 135, sin 15·cos 135, cos 135·cos 15, sin 135·sin 15 and sin·135·cos 15. A return is thereafter made to the label "COMP2" where another date is looked for; as long as the end-of-zone code has not been detected (box K180) the same procedure is restarted and in the different memories whose locations are marked by the content of the register the said quantities are accumulated, as this is indicated in the boxes K191, K193, K195 and K197. When the end of the zone has been detected, one proceeds to the label "COMP3"; at box K200 the content of the memory CALCUL is incremented by one unit. At box K202 it is checked whether the zones have been explored, that is to say it is checked whether the content of the memory CAL-CUL has reached the FIG. 10. If no, one proceeds to the label "COMP1" to calculate the address of the new zone to be processed (box K172) and to calculate the address (boxes K174 and K176) of the different memories intended to contain the total sum of the above-mentioned quantities. When all these dates of all the zones have been processed, the subsequent operation is the evaluation of all the elements of the matrix M and those of the column vector Z.

At box K203, the content of the memory CAMP is transferred to a memory which bears the same name as the quantity it is intended to contain, namely M11; at box K204 the content of the memory SYEC is transferred to a memory designated Z1. At box K206 the value of the address of the first eight-bit byte of the memory SS15 is placed in the register U. Thereafter, at box K210, the quantity (M1.2) is evaluated. For that purpose, the nine quantities contained in memory SS15 are accumulated in the memory M1.2. As is known, there is a memory SS15 for each zone, so that at box K210 the content of these memories SS15 is accumulated in the memory M1.2. This operation is made easier by the fact that the addresses of these memories are numbered sequentially. At the boxes K211, K212, K213, K214, K215, K216, K217, K218, K219, K220, K221, K222, K223, K224, K225, K226 and K227 the sum is taken of the respective nine quantities contained in the memories SC15, SS135, SC135, SS215, SC215, SS2135, SC2135, SYS15, SYC15, SYS135, SYC135, SSC15, SSC13, SC1, SC2, SS1 and SS2 to obtain the values M1.3 M1.4 M1.5 M2.2 M3.3 M4.4 M5.5 Z2 Z3 Z4 Z5 M2.3 M4.5 M2.5 M3.5 M2.4 M3.4.

To obtain these values, it has been necessary to convert the values of the dates into angular values TETA15 and TETA135. This conversion is effected in the sub-program TETA whose flowchart is shown in FIG. 16. To explain the operations of this sub-program, reference is made to FIG. 13. Take a pulse Y(t) whose date of reception is contained in the memory DATE and whish is received in the IRQ8. This date is determmined from a value t=0 considered at the beginning of the IRQ8. The value TETA135 (box K240) is simply given by:

$$(TETA135) = (OFF135) + (DATE)$$

whereas TETA15 (box K242):

$$(TETA15) = (OFF15) + [(CALCUL - 1) \times 40°] + (DATE)/9$$

CALCUL gives the number of the IRQ counted from IRQ5, that is to say for the IRQ5 there is (CALCUL)=0, IRQ6 (CALCUL)=1 . . . It should be noted that there is correspondance between CALCUL and NREF.

Figure 17:
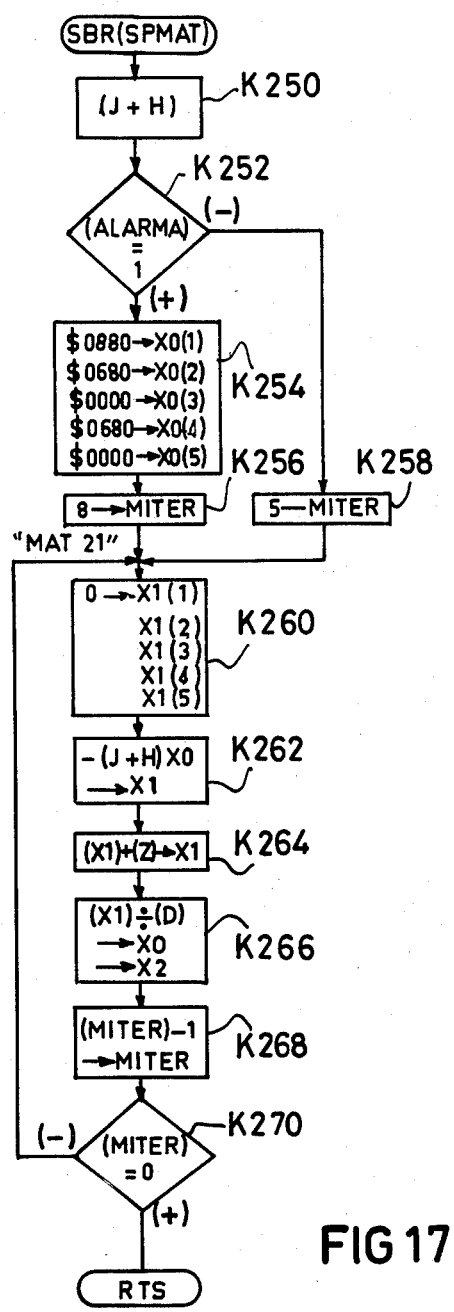
FIG. 17 shows a flowchart of a sub-program SPMAT mentioned in the flowchart of FIG. 5.

The sub-program SPMAT which follows after the sub-program COMPUT (see FIG. 5) consists in evaluating the column vector X by iteration (see annex). The flowchart of this sub-program is shown in FIG. 17. The first job indicated in box K250 is the processing of the matrix (J+H). For that purpose, memory space consisting of twenty-five locations of two eight-bit bytes designated DEB (i,i+1) is reserved, thus the matrix (J+H) will first of all be formed by placing 0 in the locations DEB(0,1), DEB(12,13), DEB(24,25), DEB(36,37), DEB(48,49).

Thereafter:

| | |
|---|---|
| (M1,2) in DEB(2,3) | DEB(10,11) |
| (M1,3) in DEB(4,5) | DEB(20,21) |
| (M1,4) in DEB(6,7) | DEB(30,31) |
| (M1,5) in DEB(8,9) | DEB(40,41) |
| (M2,3) in DEB(14,15) | DEB(22,23) |
| (M2,4) in DEB(16,17) | DEB(32,33) |
| (M2,5) in DEB(18,19) | DEB(42,43) |
| (M3,4) in DEB(26,27) | DEB(34,35) |
| (M3,5) in DEB(28,29) | DEB(44,45) |
| (M4,5) in DEB(38,39) | DEB(46,47) |

Thereafter, (at box K252) a check is made relative to "1" of the content of a memory ALARMA; if this is equal to "1", the values corresponding to an initial column vector XO are placed in different memories XO(1), XO(2), XO(3), XO(4) and XO(5). For these values were chosen: $0880, $0680, $0000, $0680 and $0000, respectively (box K254). Thereafter, at box K256, 8 is placed in a memory MITER, which corresponds to the number of iterations which will be effected to determine the value of the column vector X. If the content of the memory ALARMA is not equal to "1", 5 is placed in the memory MITER. The memory ALARMA gives a choice between two values of the initial column vector X. If the content of this memory is equal to "1", the initial vector is taken whose values have been defined at box K254 and eight iterations are used. If the content is equal to "0", the initial vector is the vector which was found last and the number of iterations is reduced to five. Once the memory MITER is filled to capacity, one proceeds to the label "MAT21". There, the memory locations reserved to contain the components of the vector X1 are set to "0", that is to say the memory locations indicated by: X1(1), X1(2), X1(3), X1(4), X1(5). Thereafter, at box K262, the indicated matrix calculation is effected. Similarly, in accordance with this calculation, for the first component:

$$(X1(1) = -(DEB(0,1))\cdot(XO(1)) - (DEB(1,2))\cdot(X-O(2)) - (DEB(2,3))\cdot(XO(3)) - (DEB(4,5))\cdot(X-O(4)) - (DEB(6,7))\cdot(XO(5))$$

and so forth for the other components.

Thereafter, at box K264, the components of Z already calculated (see FIG. 15, boxes K204, K218, K219, K220 and K221) are added to the above-mentioned components.

At box K266, each component contained in the memory is divided by the diagonal terms D of the matrix M, is thereafter transferred on the one hand to the locations XO in view of a new iteration and, on the other hand, to the locations X2 for the subsequent calculations:

$$(X1(1)) - (M1,1) \rightarrow XO(1) \text{ and } X2(1)$$

$$(X2(2)) - (M2,2) \rightarrow XO(2) \text{ and } X2(2)$$

$$(X3(3)) - (M3,3) \rightarrow XO(3) \text{ and } X2(3)$$

$$(X4(4)) - (M4,4) \rightarrow XO(4) \text{ and } X2(4)$$

$$(X5(5)) - (M5,5) \rightarrow XO(5) \text{ and } X2(5)$$

One unit is taken from the content of the memory MITER (box K268) and this content is compared to "0", (box K270); if it is equal to "0", the sub-program SPMAT is ended, if no, one returns to the label "MAT21" for a new iteration.

Figure 18:
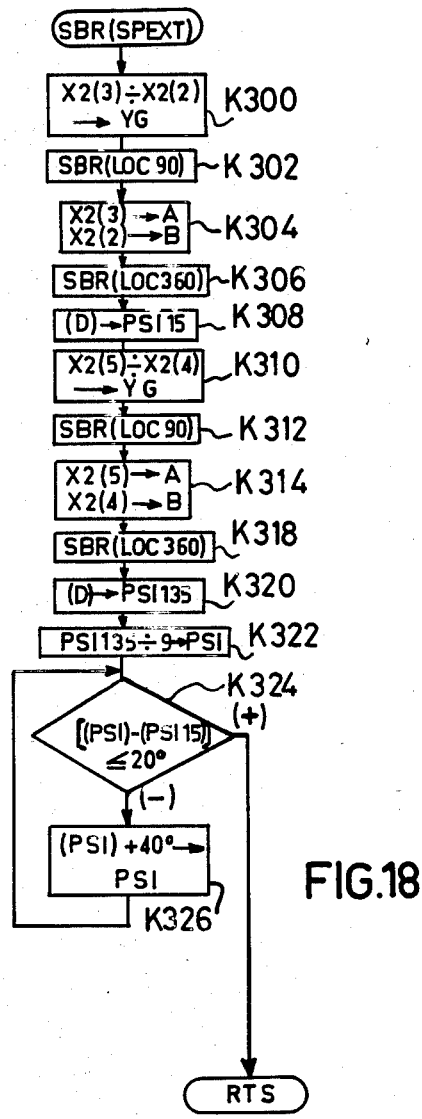
FIG. 18 shows a flowchart of a sub-program SPEXT mentioned in the flowchart of FIG. 5.

In the subsequent sub-program SPEXT whose flowchart is shown in FIG. 18, the first operation is, at box K300, to divide the third component of the vector X by the second component; the result is placed in a memory YG. This result corresponds to tg $\phi$15, see formula (3) in the annex; to calculate this angle $\phi$15 from the value of its tangent a sub-program LOC90 (box K302) is used. The angle thus found is only determined modulo 90°. In order to determine it modulo 360°, the values of the components X2(3) and X2(2) are placed in the registers A and B, respectively (box K304) and the sub-program LOC360 (box K306) is carried out; the result of this sub-program is present in the register D whose content is transferred to a memory PSI 15 (box K308). In order to calculate the angle $\phi$135, almost the same procedure is carried out as for the angle $\phi$15. The fifth component of the vector X is divided by the fourth component, box K310. The result is placed in the memory YG. Thereafter, the angle $\phi$135 is determined modulo 90° by the sub-program LOC90 (box K312). To carry out the sub-program LOC360, the fifth and fourth components of the vector are placed in the registers A and B, respectively (box K314); after this sub-program has been carried out (box K318), the content of the memory D is divided by 9 and placed in a memory PSI (box K322) with a view of determining the above-defined angle TAC.

At box 324 it is checked whether the absolute value of the difference between the content of the memory PSI and the content of the memory PS115 is less than or equal to 20°; if not, 40° is added to the angle whose value is contained in the memory PSI (box K326) and the test indicated at box K324 is effected again; when the above-mentioned difference is indeed less than or equal to 20° then the content of the memory PSI is the angle TACAN searched for. This value will be conveyed to the display register 74 during the IRQ1 (box K40), FIG. 6).

Figure 19:
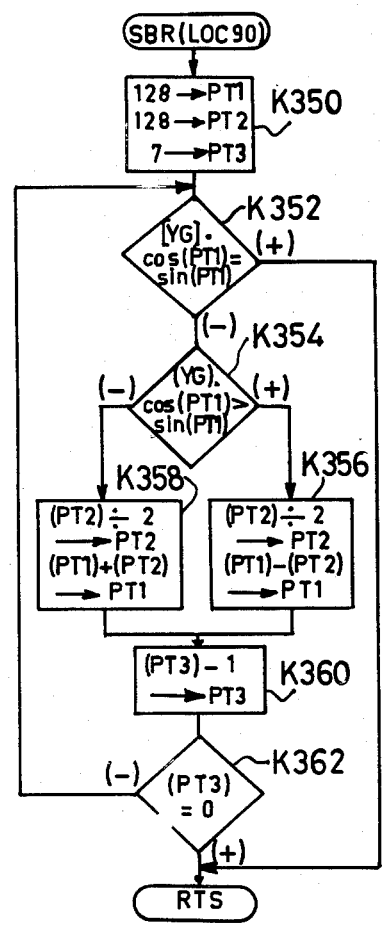
FIG. 19 shows a flowchart of a sub-program LOC90 mentioned in the flowchart of FIG. 18.

The sub-program LOC90 whose flowchart is shown in FIG. 19 has for its object, as mentioned already in the foregoing, to determine the quantity:

$$\phi_i = \text{arctg } x_i/x_j$$

To obtain this quantity a search is made for an angle "p" such that:

$$\text{tg}\phi_i \cos p = \sin p$$

and so $p = \phi_i$.

The procedure to determine p is a dichotomic process.

The sub-program starts with an initiating phase (box K350)·128 is placed in the memories PT1 and PT2 and 7 in a memory PT3. The tangent of the angle searched for is contained in the memory YG (boxes K300 and K310), the content of this memory is multiplied by the cosine of the angle whose value is contained in the memory PT1; the result of this multiplication is compared to the sign of the angle whose value is contained in this same memory PT1. If there is equality (box K352), the angle PT1 corresponds to the angle searched for; if there is no equality, it is checked whether the result of the multiplication exceeds sin (PT1) (box K354), if no, the value of the angle PT1 must be reduced (box K356). This reduction consists in taking from the content of PT1 the half-value of the value contained in the memory PT2. This half-value is stored in this same memory PT2; if yes, the value of this angle is increased (box K358) by this same half-value. Thereafter a unit is taken from the content of the memory PT3 (box K360) and it is checked whether this content takes the value "0" (box K362). The value "0" indicates that the execution of this sub-program has ended. If this value "0" has not been reached, then a further iteration is effected and the test indicated at box K352 is resumed. At the end of this sub-program the value of the angle is present in the memory PT1.

Figure 20:
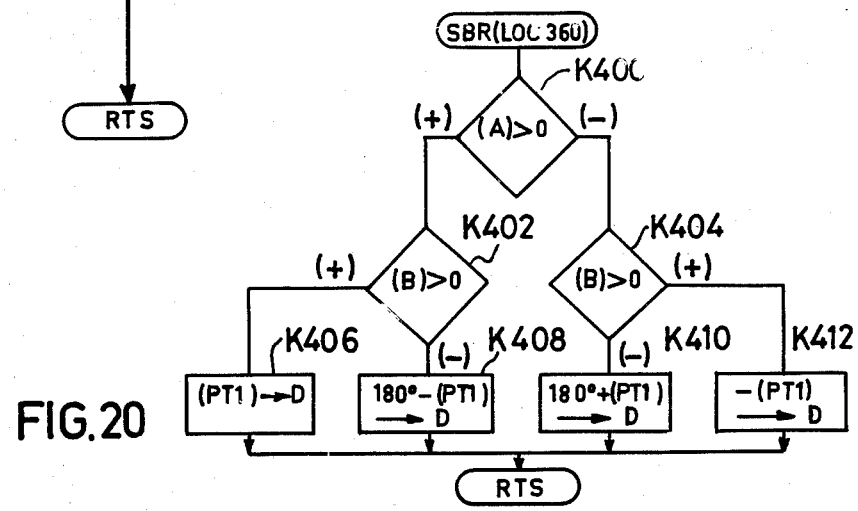
FIG. 20 shows a flowchart of a sub-program LOC360 mentioned in the flowchart of FIG. 18.

The sub-program LOC 360 whose flowchart is shown in FIG. 20 has for its object to determine in which quadrant this angle is present. This is simply effected by checking the sign of its sine, of its cosine whose values are contained in the registers A and B, respectively (see boxes K304 and K314). First of all the sign of A (box K400) is checked, thereafter the sign of B (boxes K402 and K404). If the signs of (A) and (B) are both positive, the content of PT1 is the value searched for. Then the content of PT1 is transferred to D (box K406). If the sign of (A) is positive and if the sign of (B) is negative, the value of 180° taken from the content of the PT1 is stored (box K408) in the register D. If the sign of (A) is negative and also that of (B), then the value of the content of PT1 increased by 180° is stored (box K410) in the register D. If the content of (A) is negative and that of (B) is positive then the negative value of the content of PT1 is stored (box K412) in the register D.

It will be seen that, thanks to the invention, the TACAN angle is determined by the groups of pulses located between two reference trains and that the number of pulses of a group can vary to a large extent. In addition, because the TACAN angle is supplied for each group independently, the arrangemennt according to the invention supplies information rapidly.

ANNEX

The expression (1) can be written in matrix form as follows:

$$y(t) = [1\ \sin\omega t\cos\omega t\sin 9\omega t\cos 9\omega t] \begin{bmatrix} c \\ a\cos\phi_{15} \\ a\sin\phi_{15} \\ b\cos\phi_{135} \\ b\sin\phi_{135} \end{bmatrix} + n(t) \quad (2)$$

line vector P          column vector X

The column vector X contains the unknown quantities a, b, c, $\phi_{15}$ and $\phi_{135}$.

The line vector P comprises known quantities as these quantities are processed on the basis of the knowledge of the amplitude y(t) and of the time of arrival of the pulse.

It should be noted that:

$$a^2 = x_2^2 + x_3^2$$

$$b^2 = x_4^2 + x_5^2$$

$$\phi_{15} = \arctan x_3/x_2$$

$$\phi_{135} = \arctan x_5/x_4$$

Given that $x_2$, $x_3$, $x_4$ and $x_5$ are components of the vector $\overrightarrow{X}$ $$\overrightarrow{X} = \begin{bmatrix} x_1 \\ x_2 \\ x_3 \\ x_4 \\ x_5 \end{bmatrix} = \begin{bmatrix} c \\ a\cos\phi_{15} \\ a\sin\phi_{15} \\ b\cos\phi_{135} \\ b\sin\phi_{135} \end{bmatrix}$$

Taking again the line vector P of the expression (2)

$$P = [1\ \sin\omega t\ \cos\omega t\ \sin 9\ \omega t\ \cos 9\ \omega t]$$

a column sector $P_T$ can be defined:

$$P^T = \begin{bmatrix} 1 \\ \sin\omega t \\ \cos\omega t \\ \sin 9\omega t \\ \cos 9\omega t \end{bmatrix}$$

From the latter, the expression (2) is modified:

$$y(t)\cdot P^T = P^T\cdot P\cdot X + n(t)\cdot P^T$$

that is to say:

$$\begin{bmatrix} y(t) \\ y(t)\sin\omega t \\ y(t)\cos\omega t \\ y(t)\sin 9\omega t \\ y(t)\cos 9\omega t \end{bmatrix} = \begin{bmatrix} 1 \\ \sin\omega t \\ \cos\omega t \\ \sin 9\omega t \\ \cos 9\omega t \end{bmatrix} [1\ \sin\omega t\cos\omega t\sin 9\omega t\cos 9\omega t]\cdot \overrightarrow{X} + n(t)P^T$$

Said method can be applied in a general way to a set of pulses received in a time interval T. Thus, one proceeds to the accumulation of the quantities obtained.

In such a case, the additive noise may be considered as having a mean value zero and n(t)=0 and then:

$$\Sigma_T y(t)\, P^T = \Sigma_T P^T P\, \overrightarrow{X}$$

and the expression:

$$Z = \begin{bmatrix} \Sigma_T y(t) \\ \Sigma_T y(t)\sin\omega t \\ \Sigma_T y(t)\cos\omega t \\ \Sigma_T y(t)\sin 9\omega t \\ \Sigma_T y(t)\cos 9\omega t \end{bmatrix} = M\cdot \overrightarrow{X}$$

is obtained.

To obtain the TACAN angles, the matrix M must be inverted.

Calculating X and, consequently, $\phi_{15}$ and $\phi_{135}$ is therefore possible on the basis of the knowledge of Z and M.

To that end, the quantities sin $2\pi\cdot 15t$, cos $2\pi\cdot 15t$, sin $2\pi\cdot 135t$, and cos $2\pi\cdot 135t$ are processed for each received sample so that at each instant t each parameter determining Z and M is calculated, and all these values are accumulated at time T.

The matrix M obtained is symmetrical and in certain circumstances has a special characteristic.

Specifically, it can be demonstrated that for an equidistant pulse distribution (regularly spaced pulse train) during the time interval T the diagonal quantities $M_{22}$, $M_{33}$, $M_{44}$ and $M_{55}$ tend towards N/2 and the quantities $M_{ij\ i\neq j}$ located outside the main diagonal become identical to zero.

In these conditions, M may be written:

$$M = \begin{bmatrix} N & 0 & 0 & 0 & 0 \\ 0 & N/2 & 0 & 0 & 0 \\ 0 & 0 & N/2 & 0 & 0 \\ 0 & 0 & 0 & N/2 & 0 \\ 0 & 0 & 0 & 0 & N/2 \end{bmatrix}$$

If the distribution is out-of-balance which is the case when the pulses are grouped at a time which is low relative to T, the quantities outside the main diagonals will differ from zero and the matrix will only keep its symmetric property.

If the distribution is a random distribution, but statistically equidistant (which is the case for TACAN signals), a diagonal or almost diagonal matrix M can be found. M can then be written:

$$M = D + (J + H)$$

D: diagonal matrix

J+H: extra-diagonal matrix $$D = \begin{bmatrix} M_{11} & 0 & 0 & 0 & 0 \\ 0 & M_{22} & 0 & 0 & 0 \\ 0 & 0 & M_{33} & 0 & 0 \\ 0 & 0 & 0 & M_{44} & 0 \\ 0 & 0 & 0 & 0 & M_{55} \end{bmatrix}$$

Assuming $(J+H)=E$ $$E = \begin{bmatrix} 0 & M_{12} & M_{13} & M_{14} & M_{15} \\ M_{21} & 0 & M_{23} & M_{24} & M_{25} \\ M_{31} & M_{32} & 0 & M_{34} & M_{35} \\ M_{41} & M_{42} & M_{43} & 0 & M_{45} \\ M_{51} & M_{52} & M_{53} & M_{54} & 0 \end{bmatrix}$$

By way of reminder, $M_{ij} << M_{ii}$ $i \neq j$ $1 \leq i \leq 5$ $1 \leq j \leq 5$ E is called the error matrix since it does only contain quantities near zero.

$\vec{Z} = M\vec{X}$ becomes:

$D\vec{X} = -E\vec{X} + \vec{Z}$ $\vec{X} = -D^{-1}E\vec{X} + D^{-1}\vec{Z}$ from which an iterative expression:

$\vec{X}_n = -D^{-1} \cdot E \cdot \vec{X}_{n-1} + D^{-1}\vec{Z}$ is obtained or, when $\vec{W} = D^{-1}\vec{Z}$ and $F = -D^{-1}E$:

$$\boxed{\vec{X}_n = F\vec{X}_{n-1} + \vec{W}}$$

Note 1:

$\vec{W}$ is the diagonal solution or, put differently, the true solution of M is reduced by convergence to a diagonal matrix.

$F \cdot \vec{X}_{n-1}$ is the correction vector, calculated and improved at each iteration.

Note 2:

The higher the number of iterations the more $X_n$ tends towards X.

$\lim_{n \to \infty} \vec{X}_n = \vec{x}$ (8) can be written:

$\vec{X}_{n-1} = F\vec{X}_{n-2} + \vec{W}$
$\vec{X}_{n-2} = F\vec{X}_{n-3} + \vec{W}$
.
.
$\vec{X}_1 = F\vec{X}_0 + \vec{W}$ from which:

$\vec{X}_n = F^n\vec{X}_0 + (F^n + F^{n-1} + \ldots + F)\vec{W} + \vec{W}$  (10)

In this expression, $\vec{X}_0$ represents the starting vector.

It can be seen that $\vec{X}_0$ is less important according as n increases, as:

$\lim_{n \to \infty} F^n = [0]$

What is claimed is:

1. Apparatus for installation in an aircraft for receiving signals of the TACAN type transmitted by a beacon and producing a display of the TACAN bearing angle TAC of the aircraft with respect to such beacon, whereby the aircraft can be navigated in accordance with the displayed bearing angle TAC; such apparatus deriving the TACAN bearing angle TAC in accordance with $TAC = (\phi 135/9) + (k \cdot 40°)$ where k $(0 \leq k < 9)$ is such that $|TAC - \phi 15| \leq 20°$ and the values $\phi 15$ and $\phi 135$ are defined by received signals which are in the form of pulses whose amplitude y(t) as a function of the time "t" is given by $y(t) = a \sin(\omega t + \phi 15) + b \sin(9\omega t + \phi 135) + c + n(t)$ where a, b, c and $\omega$ are constants and n(t) is a noise component; such apparatus comprising:

accumulator means for accumulating a number N of the received pulses correlated with their times of arrival "t";

storing means for storing data representing a matrix M given by $$M = \begin{vmatrix} M_{1,1} & M_{1,2} & M_{1,3} & M_{1,4} & M_{1,5} \\ M_{2,1} & M_{2,2} & M_{2,3} & M_{2,4} & M_{2,5} \\ M_{3,1} & M_{3,2} & M_{3,3} & M_{3,4} & M_{3,5} \\ M_{4,1} & M_{4,2} & M_{4,3} & M_{4,4} & M_{4,5} \\ M_{5,1} & M_{5,2} & M_{5,3} & M_{5,4} & M_{5,5} \end{vmatrix}$$

where:

$M_{1,1} = N \quad M_{2,2} = \sum_{i=1}^{N} \sin^2\omega t_i \quad M_{3,3} = \sum_{i=1}^{N} \cos^2\omega t_i$ $M_{4,4} = \sum_{i=1}^{N} \sin^2\omega' t_i \quad M_{5,5} = \sum_{i=1}^{N} \cos^2\omega' t_i$ $M_{1,2} = M_{2,1} = \sum_{i=1}^{N} \sin\omega t_i \quad M_{1,3} = M_{3,1} = \sum_{i=1}^{N} \cos\omega t_i$ $M_{1,4} = M_{4,1} = \sum_{i=1}^{N} \sin\omega' t_i \quad M_{1,5} = M_{5,1} = \sum_{i=1}^{N} \cos\omega' t_i$ -continued $$M_{2,3} = M_{3,2} = \sum_{i=1}^{N} \sin\omega ti \cdot \cos\omega ti$$

$$M_{2,4} = M_{4,2} = \sum_{i=1}^{N} \sin\omega ti \cdot \sin\omega' ti$$

$$M_{2,5} = M_{5,2} = \sum_{i=1}^{N} \sin\omega ti \cdot \cos\omega' ti$$

$$M_{3,4} = M_{4,3} = \sum_{i=1}^{N} \cos\omega ti \cdot \sin\omega' ti$$

$$M_{3,5} = M_{5,3} = \sum_{i=1}^{N} \cos\omega ti \cdot \cos\omega' ti$$

$$M_{4,5} = M_{5,4} = \sum_{i=1}^{N} \sin\omega ti \cdot \cos\omega' ti$$

where $\omega' = 9\omega$;

such storing means further storing data representing a column vector Z given by $$Z = \begin{vmatrix} \sum_{i=1}^{N} y(ti) \\ \sum_{i=1}^{N} y(ti)\sin\omega ti \\ \sum_{i=1}^{N} y(ti)\cos\omega ti \\ \sum_{i=1}^{N} y(ti)\sin\omega' ti \\ \sum_{i=1}^{N} y(ti)\cos\omega' ti \end{vmatrix}$$

calculating means for calculating a column vector X from M and Z given by $$X = \begin{vmatrix} x1 \\ x2 \\ x3 \\ x4 \\ x5 \end{vmatrix} = \begin{vmatrix} c \\ a \cos\phi\, 15 \\ a \sin\phi\, 15 \\ b \cos\phi\, 135 \\ b \sin\phi\, 135 \end{vmatrix} = M^{-1} \cdot Z$$

such calculating means determining the angles $\phi 15$ and $\phi 135$ in accordance with the relationships $$\phi 15 = \text{arctg } x3/x2$$

$$\phi 135 = \text{arctg } x5/x4$$

and determining the TACAN angle TAC from $\phi 15$ and $\phi 135$;

said storing means and said calculating means being comprised in a microprocessor assembly which further comprises a read-only memory which stores intercept programs for controlling operation of said calculating means to determine the TACAN angle TAC;

said microprocessor assembly having an input for receiving interrupt signals which cause said calculating means to execute the intercept programs stored in said read-only memory, and further comprising an interrupt circuit for generating such interrupt signals and supplying them to the interrupt input of the microprocessor assembly, whereby said calculating means executes such intercept programs to determine the TACAN angle TAC;

and means controlled by said calculating means for displaying the bearing of said aircraft relative to said beacon in accordance with the calculated TACAN angle TAC.

2. Apparatus as claimed in claim 1, wherein the calculating means determines the column vector X from M and Z by estimating the vector X in accordance with the recursive expression $$x_n = D^{-1}(-(J+H)X_{n-1} + Z)$$

where D represents a diagonal matrix and $(J+H)$ satisfies the expression:

$$M = D - (-(J+H)).$$

3. Apparatus as claimed in claim 1, wherein the received signal pulses y(t) are in analog form and the accumulator means comprises a first in first out (FIFO) memory having first and second inputs; such apparatus further comprising an analog-to-digital converter to which the received signals are applied and which converts them to digital signals corresponding to the amplitudes thereof; the first inputs of the FIFO memory being connected to the analog-to-digital converter to store said digital signals; such apparatus further comprising a time counter to which the received signals are applied and which produces counts signifying the time of arrival (t) of each of the received signal pulses; the second inputs of the FIFO memory being connected to the time counter to store the counts produced thereby.

4. Apparatus as claimed in claim 3, wherein the microprocessor assembly further comprises a data bus and an address bus; such apparatus further comprising input and output control arrangements for the FIFO memory and which are connected to the address bus of the microprocessor assembly by means of a decoding circuit, the outputs of the FIFO memory being coupled to the data bus.

5. Apparatus as claimed in claim 3, wherein the microprocessor assembly cyclically numbers the interrupt signals and controls the FIFO memory in accordance therewith; a first set of such interrupt signals causing the FIFO memory to store the digital signals and their times of arrival, and a second set of such interrupt signals causing the FIFO memory to read out the digital signals and their times of arrival.

* * * * *